United States Patent
Ikemoto

(10) Patent No.: US 11,459,942 B2
(45) Date of Patent: Oct. 4, 2022

(54) CONTROL DEVICE FOR INTERNAL COMBUSTION ENGINE

(71) Applicant: TOYOTA JIDOSHA KABUSHIKI KAISHA, Toyota (JP)

(72) Inventor: Masato Ikemoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/494,186

(22) Filed: Oct. 5, 2021

(65) Prior Publication Data
US 2022/0235696 A1     Jul. 28, 2022

(30) Foreign Application Priority Data
Jan. 25, 2021   (JP) .............................. JP2021-009702

(51) Int. Cl.
F02B 37/22    (2006.01)
F02B 37/24    (2006.01)
F02D 41/00    (2006.01)
F02P 5/15     (2006.01)

(52) U.S. Cl.
CPC .............. F02B 37/24 (2013.01); F02B 37/22 (2013.01); F02D 41/0007 (2013.01); F02P 5/1516 (2013.01); F02D 2041/002 (2013.01); F02D 2200/025 (2013.01)

(58) Field of Classification Search
CPC ...... F02B 37/24; F02B 37/22; F02D 41/0007; F02D 2041/002; F02D 2200/025
USPC ................................ 123/559.2, 561; 60/602
See application file for complete search history.

(56) References Cited

U.S. PATENT DOCUMENTS

| | | | | |
|---|---|---|---|---|
| 6,378,308 B1 * | 4/2002 | Pfluger | .................. | F02B 37/18 60/624 |
| 7,463,969 B2 * | 12/2008 | Yamaguchi | ............. | F02B 37/12 701/115 |
| 2003/0182940 A1 * | 10/2003 | Nishiyama | .......... | F02D 41/0007 60/602 |
| 2014/0360185 A1 * | 12/2014 | Boyer | .................... | F02M 26/04 60/273 |

(Continued)

FOREIGN PATENT DOCUMENTS

| DE | 102015119932 A1 * | 6/2016 | .............. F02B 33/44 |
|---|---|---|---|
| JP | 2011-085048 A | 4/2011 | |
| JP | 2016173056 A * | 9/2016 | .............. F02B 37/24 |

*Primary Examiner* — Erick R Solis
(74) *Attorney, Agent, or Firm* — Finnegan, Henderson, Farabow, Garrett & Dunner, LLP

(57) ABSTRACT

There is provided a control device for an internal combustion engine including a variable-capacity turbocharger, which has a turbine with a variable nozzle and an actuator that controls the variable nozzle opening degree, and a throttle disposed in an intake passage. The control device includes an electronic control unit (ECU). The ECU include a first control mode as a control mode for the intake air amount. When an air amount range on the high flow rate side including a maximum value of a required air amount for the internal combustion engine is defined as a high air amount range, the ECU controls the actuator and the throttle so as to increase the throttle opening degree while maintaining the variable nozzle at a fully-closed opening degree as the required air amount is increased in the high air amount range on the side of the maximum value in the first control mode.

16 Claims, 11 Drawing Sheets

(56) References Cited

U.S. PATENT DOCUMENTS

2016/0153353 A1\* 6/2016 Masuma .............. F02B 37/24
  60/602
2021/0262483 A1\* 8/2021 Henzler .............. F04D 29/663

\* cited by examiner

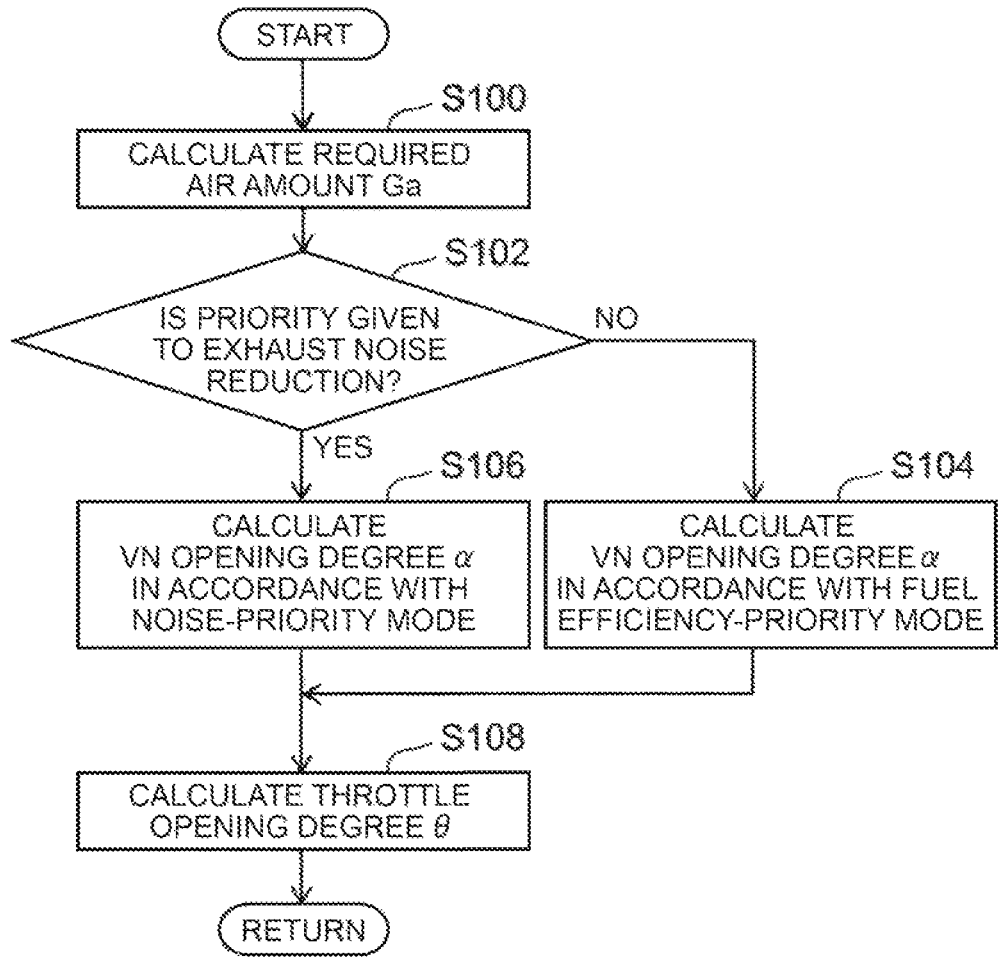
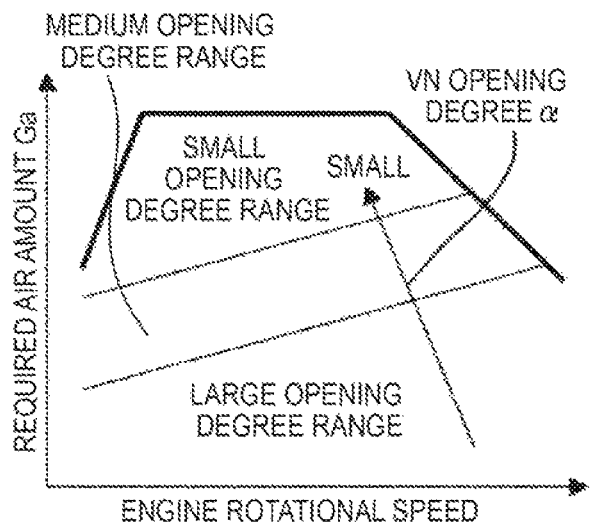
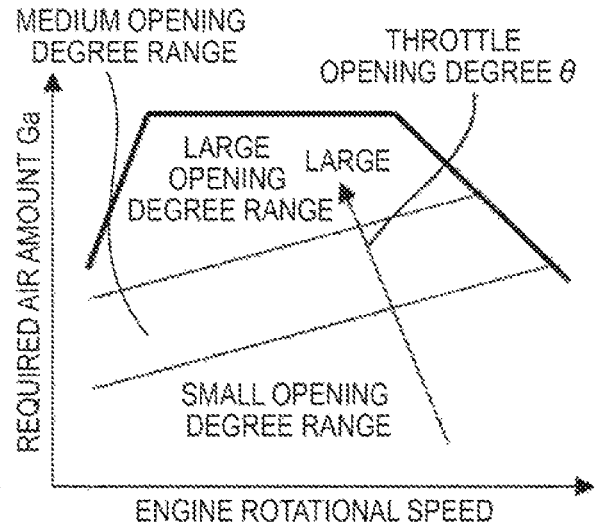

CONTROL DEVICE FOR INTERNAL COMBUSTION ENGINE

CROSS-REFERENCE TO RELATED APPLICATION

This application claims priority to Japanese Patent Application No. 2021-009702 filed on Jan. 25, 2021, incorporated herein by reference in its entirety.

BACKGROUND

1. Technical Field

This disclosure relates to a control device for an internal combustion engine that includes a variable-capacity turbocharger.

2. Description of Related Art

Japanese Unexamined Patent Application Publication No. 2011-085048 (JP 2011-085048 A) discloses a control device for an internal combustion engine that includes a variable-capacity turbocharger. This control device immediately lowers the turbo rotational speed by closing a variable nozzle (nozzle vane), in order to suppress manifestation of noise due to rotation of the turbocharger when the engine rotational speed is lowered abruptly.

SUMMARY

In a high-load range (in particular, low rotation side) of the internal combustion engine, exhaust noise is mainly caused by a combustion primary component of combustion, and the exhaust noise is larger as the amplitude value of exhaust pressure pulsation that accompanies combustion is larger. The device described in JP 2011-085048 A is not applicable to suppression of exhaust noise in the high-load range (high air amount range).

The present disclosure has been made in view of the foregoing issue, and provides a control device for an internal combustion engine that includes a variable-capacity turbocharger, the control device being able to achieve required engine torque while suppressing exhaust noise in a high-load range using intake air amount control including control of the variable nozzle opening degree.

A first aspect of the present disclosure relates to a control device for an internal combustion engine including a variable-capacity turbocharger that includes a turbine with a variable nozzle and an actuator configured to control a variable nozzle opening degree, and a throttle disposed in an intake passage. The control device includes an electronic control unit configured as follows. That is, the electronic control unit includes a first control mode as one of control modes for an intake air amount. The electronic control unit is configured to, when an air amount range on a high flow rate side including a maximum value of a required air amount for the internal combustion engine is defined as a high air amount range, control the actuator and the throttle so as to increase a throttle opening degree while maintaining the variable nozzle at a fully-closed opening degree or a substantially fully-closed opening degree, or while decreasing the variable nozzle opening degree, as the required air amount is increased in the high air amount range on a side of the maximum value in the first control mode.

In the control device according to the first aspect, the electronic control unit may include a second control mode as another one of the control modes. The electronic control unit may be configured to control the actuator and the throttle so as to decrease the variable nozzle opening degree while maintaining the throttle at a fully-open opening degree or a substantially fully-open opening degree as the required air amount is increased in the high air amount range on the side of the maximum value in the second control mode.

A second aspect of the present disclosure relates to a control device for an internal combustion engine including a variable-capacity turbocharger that includes a turbine with a variable nozzle and an actuator configured to control a variable nozzle opening degree, a throttle disposed in an intake passage, and a variable valve drive mechanism that is configured to be able to change valve opening characteristics of an intake valve. The control device includes an electronic control unit configured as follows. That is, the electronic control unit includes a first control mode as one of control modes for an intake air amount. The electronic control unit is configured to, when an air amount range on a high flow rate side including a maximum value of a required air amount for the internal combustion engine is defined as a high air amount range, control the throttle and the variable valve drive mechanism so as to meet the required air amount while controlling the actuator so as to maintain the variable nozzle at a fully-closed opening degree or a substantially fully-closed opening degree, or so as to decrease the variable nozzle opening degree, as the required air amount is increased in the high air amount range on a side of the maximum value in the first control mode.

In the control device according to the second aspect, the electronic control unit may include a second control mode as another one of the control modes. The electronic control unit may be configured to control the actuator and the throttle so as to decrease the variable nozzle opening degree while maintaining the throttle at a fully-open opening degree or a substantially fully-open opening degree as the required air amount is increased in the high air amount range on the side of the maximum value in the second control mode.

In the control device configured as described above according to the first aspect and the second aspect, the electronic control unit may be configured to control the actuator, in the first control mode, so as to start closing the variable nozzle from the fully-open opening degree at a specific required air amount value that is small compared to during execution of the second control mode as the required air amount is increased.

In the control device configured as described above according to the first aspect and the second aspect, the electronic control unit may be configured to control the actuator, in the first control mode, so as to maintain the variable nozzle at the fully-closed opening degree or the substantially fully-closed opening degree after gradually decreasing the variable nozzle opening degree toward the fully-closed opening degree as the required air amount is increased in an air amount range on a high flow rate side relative to the specific required air amount value.

In the control device according to the first aspect and the second aspect, the internal combustion engine may include an ignition device. The electronic control unit may be configured to control the ignition device so as to advance an ignition timing from a basic ignition timing, the basic ignition timing being on a retarded side relative to an optimum ignition timing, closer to the optimum ignition timing when the first control mode is selected under an engine operation condition under which the basic ignition timing is selected. The electronic control unit may be configured to correct the variable nozzle opening degree that is set in the first control mode to a closed side by such an amount that cancels a fuel efficiency improvement margin due to advancement of the ignition timing.

In the control device according to the first aspect and the second aspect, a vehicle on which the internal combustion engine is mounted may include an input device that is configured to receive, from a driver, a noise-priority request to give priority to exhaust noise reduction over a fuel efficiency of the vehicle. The electronic control unit may be configured to select the first control mode when the input device has received the noise-priority request.

In the control device according to the first aspect and the second aspect, the electronic control unit may be configured to select the first control mode when a vehicle on which the internal combustion engine is mounted is traveling in at least one of a location and a time band in which priority is to be given to exhaust noise reduction over a fuel efficiency of the vehicle.

In the control device according to the first aspect and the second aspect, a vehicle on which the internal combustion engine is mounted may include a noise meter that is configured to measure exhaust noise emitted from an exhaust port. The electronic control unit may be configured to select the first control mode when a value of the exhaust noise measured by the noise meter is larger than a threshold.

With the control device according to the first aspect of the present disclosure, the actuator and the throttle are controlled so as to increase a throttle opening degree while maintaining the variable nozzle at a fully-closed opening degree or a substantially fully-closed opening degree, or while decreasing the variable nozzle opening degree, as the required air amount is increased in the high air amount range on a side of the maximum value in the first control mode. In this manner, when the first control mode is selected, the intake air amount is controlled by the throttle so as to meet the required air amount with the exhaust passage narrowed by the variable nozzle in the high air amount range on the side of the maximum value. Therefore, with the first aspect, it is possible to achieve required engine torque while suppressing exhaust noise in the high-load range using intake air amount control including control of the variable nozzle opening degree.

With the control device according to the second aspect of the present disclosure, meanwhile, the throttle and the variable valve drive mechanism are controlled so as to meet the required air amount while controlling the actuator so as to maintain the variable nozzle at a fully-closed opening degree or a substantially fully-closed opening degree, or so as to decrease the variable nozzle opening degree, as the required air amount is increased in the high air amount range on a side of the maximum value in the first control mode. In this manner, when the first control mode is selected, the intake air amount is controlled by the throttle and the variable valve drive mechanism so as to meet the required air amount with the exhaust passage narrowed by the variable nozzle in the high air amount range on the side of the maximum value. Therefore, also with the second aspect, it is possible to achieve required engine torque while suppressing exhaust noise in the high-load range using intake air amount control including control of the variable nozzle opening degree.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flowchart illustrating a process related to intake air amount control according to the first embodiment;

FIG. 7A is a graph for the fuel efficiency-priority mode, indicating the relationship of the VN opening degree $\alpha$ with a required air amount and the engine rotational speed;

FIG. 7B is a graph for the fuel efficiency-priority mode, indicating the relationship of a throttle opening degree with the required air amount and the engine rotational speed;

DETAILED DESCRIPTION OF EMBODIMENTS

In each of embodiments described below, elements that are common to the drawings are denoted by like signs to omit or simplify redundant description. When the number, quantity, amount, range, etc. of elements are mentioned in relation to the embodiments described below, the present disclosure is not limited to such a number etc. unless specifically stated so or if it is in principle clear that the present disclosure is limited thereto. In addition, structures, steps, etc. described in relation to the embodiments described below are not necessarily essential to the present disclosure unless specifically stated so or if it is in principle clear that the present disclosure is limited thereto.

Figure 1:
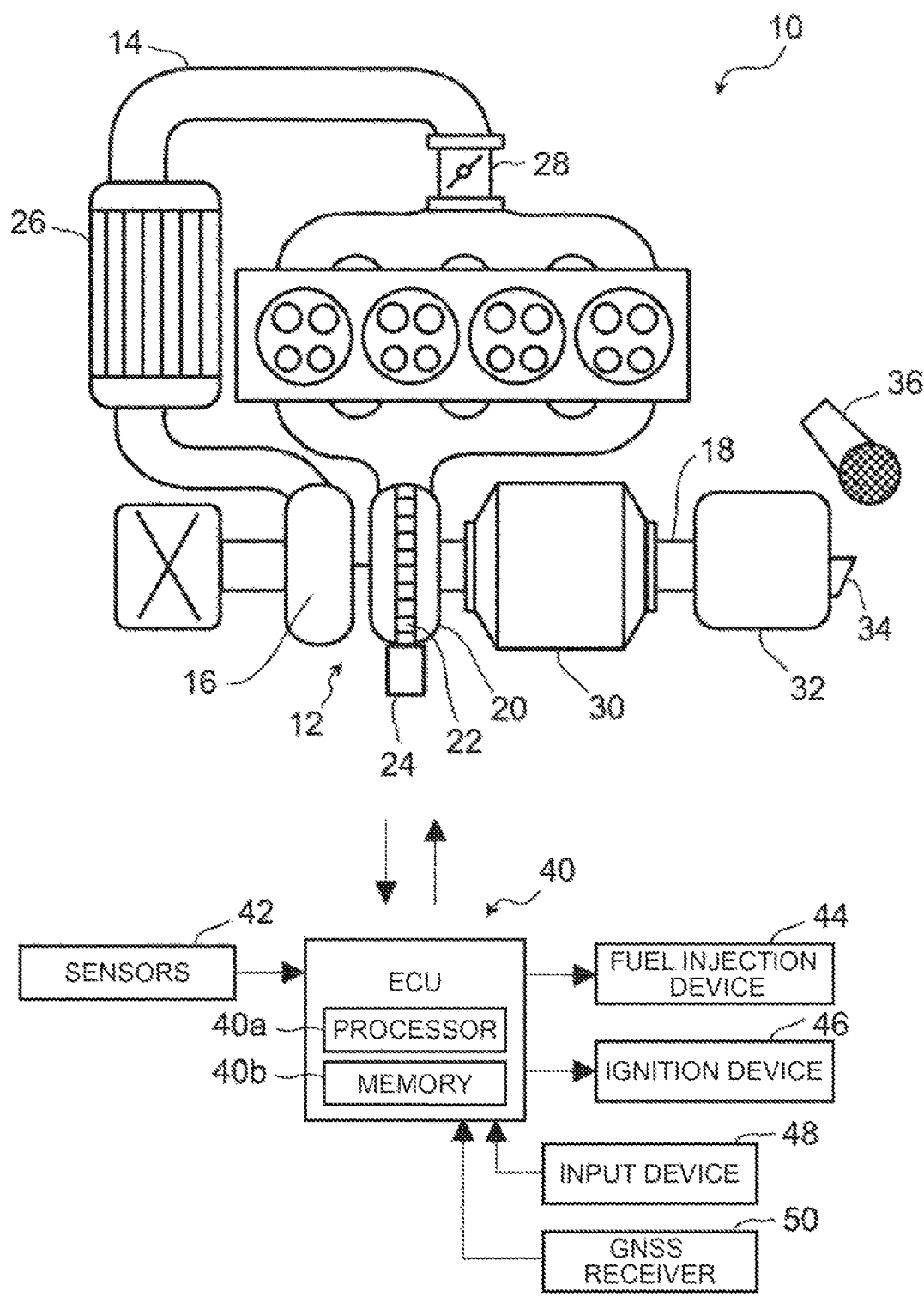
FIG. 1 is a schematic diagram illustrating an example of the system configuration of an internal combustion engine according to a first embodiment of the present disclosure.

A first embodiment of the present disclosure will be described. FIG. 1 is a schematic diagram illustrating an example of the system configuration of an internal combustion engine 10 according to a first embodiment. The internal combustion engine 10 illustrated in FIG. 1 includes a variable-capacity turbocharger 12. The turbocharger 12 includes a compressor 16 disposed in an intake passage 14, and a turbine 20 disposed in an exhaust passage 18. The turbine 20 includes a variable nozzle (VN) 22. The turbine 20 is rotated by an exhaust gas that flows through the exhaust passage 18. The compressor 16 is driven to be rotated by the turbine 20 to compress an intake air.

The turbocharger 12 further includes a VN actuator 24 that controls the opening degree (VN opening degree $\alpha$) of the VN 22. The VN actuator 24 is of a diaphragm type or an electric type, for example. When the VN opening degree $\alpha$ becomes smaller (is controlled to the closed side), the area of the entrance to the turbine 20 becomes smaller, and the flow velocity of the exhaust gas which flows into the turbine 20 becomes higher. The VN actuator 24 can adjust the amount of exhaust energy collected by the turbine 20, by varying the flow velocity of the exhaust gas which flows into the turbine 20 by adjusting the VN opening degree $\alpha$. The VN actuator 24 controls the VN opening degree $\alpha$ within a predetermined opening degree control range, from a fully-closed opening degree (minimum opening degree) to a fully-open opening degree (maximum opening degree). That is, the fully-closed opening degree and the fully-open opening degree are the respective opening degrees of the VN 22 operated so as to obtain the minimum flow path area and the maximum flow path area.

An intercooler 26 that cools the intake air which has been compressed by the compressor 16 is disposed in the intake passage 14 downstream of the compressor 16. An electronically controlled throttle 28 is disposed downstream of the intercooler 26. The intake air amount is controlled by adjusting the opening degree of the throttle 28.

One or more exhaust gas control catalysts (typically, three-way catalysts) 30 are disposed in the exhaust passage 18 downstream of the turbine 20. A muffler 32 is disposed downstream of the exhaust gas control catalysts 30. The vehicle which includes the internal combustion engine 10 includes a noise meter 36 that measures exhaust noise emitted from an exhaust port 34 corresponding to the exit of the muffler 32 (exit of the exhaust passage 18).

The system illustrated in FIG. 1 further includes an electronic control unit (ECU) 40 as a control device that controls the internal combustion engine 10. The ECU 40 includes a processor 40a and a memory 40b. The memory 40b stores various data, including a map for use for various control of the internal combustion engine 10, and various control programs. The ECU 40 implements various processes and control by the processor 40a reading the control programs from the memory 40b and executing the control programs. A plurality of ECUs 40 may be provided.

The ECU 40 retrieves a sensor signal from sensors 42 for use for various control of the internal combustion engine 10. Herein, the sensors 42 include various sensors mounted on the internal combustion engine 10 (e.g. a crank angle sensor, an engine coolant temperature sensor, an intake air temperature sensor, and an air flow sensor) and various sensors mounted on the vehicle (e.g. an accelerator position sensor). Actuators controlled by the ECU 40 include a fuel injection device 44 and an ignition device 46 for the internal combustion engine 10, in addition to the VN actuator 24 and the throttle 28 discussed above.

The vehicle which includes the internal combustion engine 10 also includes an input device 48 and a Global Navigation Satellite System (GNSS) receiver 50. The input device 48 is a human machine interface (HMI) device such as a button and a touch panel. The ECU 40 can receive a "noise-priority request" and a "fuel efficiency-priority request", to be discussed later, using the input device 48. Further, the ECU 40 can acquire position information (travel location information) on the vehicle using the GNSS receiver 50.

Next, control of the intake air amount (engine torque) performed in consideration of suppression of exhaust noise will be described. The modes of control of the intake air amount (g/s) by the ECU 40 include a "fuel efficiency-priority mode", which is a basic (in other words, normal) mode in which priority is given to the fuel efficiency over exhaust noise reduction, and a "noise-priority mode", which is a mode in which priority is given to exhaust noise reduction over the fuel efficiency. The fuel efficiency-priority mode and the noise-priority mode correspond to an example of the "second operation mode" and an example of the "first control mode", respectively, according to the present disclosure. The control modes for the intake air amount are not limited to these two control modes, and may additionally include one or more control modes for other purposes (e.g. a control mode in which priority is given to engine output).

Figure 2:
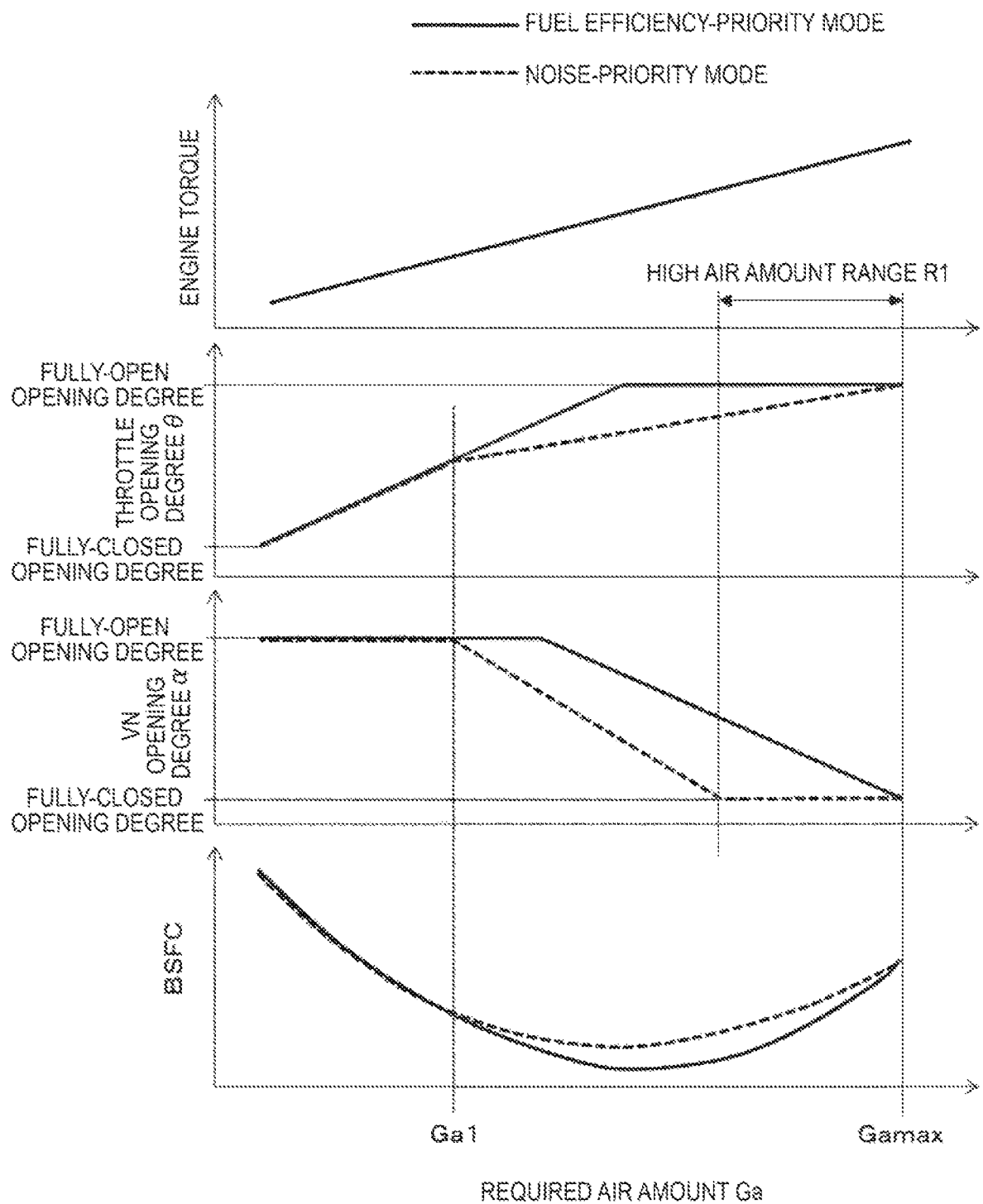
FIG. 2 is a graph for explaining a fuel efficiency-priority mode and a noise-priority mode according to the first embodiment.

FIG. 2 is a graph for explaining the fuel efficiency-priority mode and the noise-priority mode according to the first embodiment. In these control modes, the intake air amount is controlled so as to meet a required air amount Ga using control of the VN opening degree $\alpha$ by the VN actuator 24 and control of a throttle opening degree $\theta$ by the throttle 28. FIG. 2 indicates setting of the throttle opening degree $\theta$ and the VN opening degree $\alpha$ relative to the required air amount Ga on the horizontal axis. Waveforms of the throttle opening degree $\theta$ and the VN opening degree $\alpha$ indicated in FIG. 2 indicate the relationship at a constant engine rotational speed.

As indicated in FIG. 2, the engine torque basically becomes higher (in other words, the engine load becomes higher) in proportion to an increase in the required air amount Ga. Therefore, setting of the throttle opening degree $\theta$ and the VN opening degree $\alpha$ that is similar to that indicated in FIG. 2 is obtained also when the horizontal axis represents the engine torque. The same also applies to the settings indicated in FIGS. 10 and 12 to be discussed later.

Next, the fuel efficiency-priority mode will be described. In the fuel efficiency-priority mode, as indicated by the continuous line in FIG. 2, the throttle opening degree $\theta$ is increased with the VN 22 maintained at the fully-open opening degree as the required air amount Ga is increased on the low air amount side. On the high air amount side including a high air amount range R1 to be discussed later, meanwhile, the VN opening degree $\alpha$ is decreased with the throttle 28 maintained at the fully-open opening degree as the required air amount Ga is increased. A maximum value Gamax of the required air amount Ga is obtained when the throttle opening degree $\theta$ is at the fully-open opening degree and the VN opening degree $\alpha$ is at the fully-closed opening degree. In the air amount range in which the throttle 28 is maintained at the fully-open opening degree in FIG. 2, the throttle opening degree $\theta$ may be set so as to be increased with a slight slope with respect to an increase in the required air amount Ga (i.e. the throttle 28 may be maintained at a substantially fully-open opening degree so as to reach the fully-open opening degree at the maximum value Gamax, unlike the example indicated in FIG. 2.

In the example indicated in FIG. 2, the VN 22 starts closing from the fully-open opening degree at a required air amount value at which the throttle opening degree θ is close to the fully-open opening degree as the required air amount Ga is increased. As an alternative to such an example, the VN 22 may start closing when the throttle opening degree θ reaches the fully-open opening degree.

In the fuel efficiency-priority mode discussed above, the intake air amount is controlled by adjusting the throttle opening degree θ with the VN 22 at the fully-closed opening degree on the low air amount side. On the high air amount side, the intake air amount is controlled by adjusting the VN opening degree α with the throttle 28 fully open. In this manner, in the fuel efficiency-priority mode, the throttle opening degree θ is made as large as possible in each air amount range, and thus the intake air amount can be controlled while reducing the pump loss (i.e. while improving the fuel efficiency).

Next, the noise-priority mode will be described. Before specifically describing the noise-priority mode, exhaust noise to be reduced in the first embodiment and the relationship between the exhaust noise and the VN opening degree α will be described.

Figure 3:
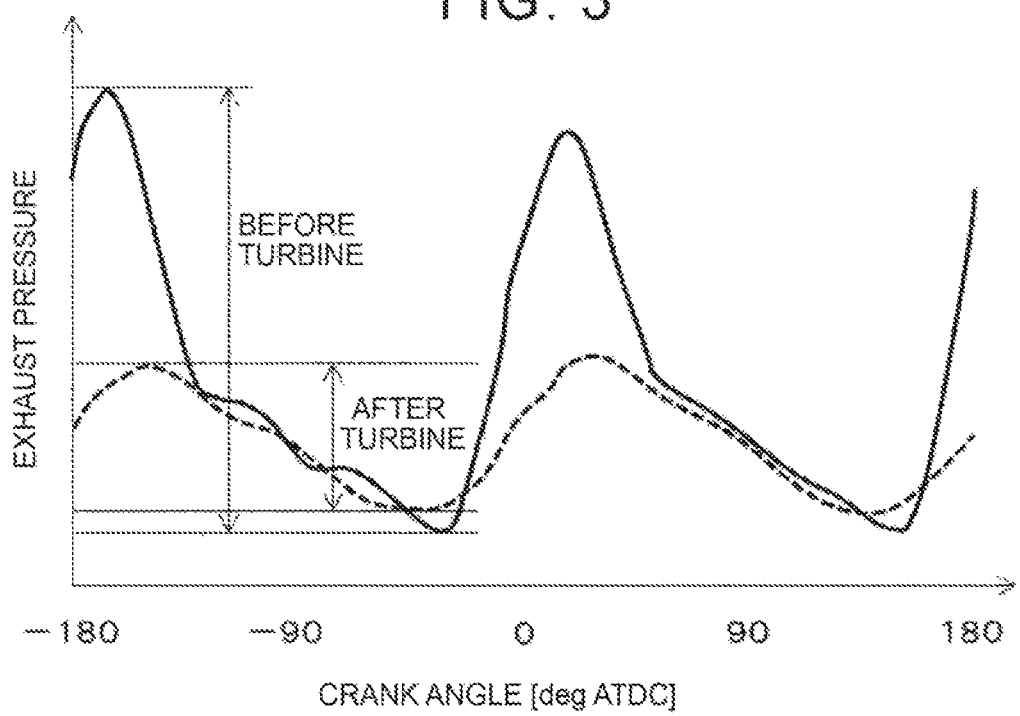
FIG. 3 is a graph indicating an example of the relationship between exhaust pressure pulsation and the crank angle according to the first embodiment.

In the high-load range (more particularly, the mid to high-load range), exhaust noise is mainly caused by a combustion primary component of combustion, in particular on the low rotation side. The exhaust noise is larger as the amplitude value of exhaust pressure pulsation that accompanies combustion is larger. FIG. 3 is a graph indicating an example of the relationship between the exhaust pressure pulsation and the crank angle. FIG. 3 indicates the waveform of exhaust pressure pulsation at a location upstream of the turbine 20 (before the turbine) and the waveform of exhaust pressure pulsation at a location downstream of the turbine 20 (after the turbine). When the turbocharger 12 is provided, a part of exhaust energy is collected by the turbine 20. Therefore, the exhaust energy after passage of the turbine is decreased as the amount of work by the turbine 20 is larger. As the exhaust energy is decreased, the amplitude of the exhaust pressure pulsation after the turbine becomes small compared to that before the turbine as indicated in FIG. 3. As a result, the exhaust noise emitted from the exhaust port 34 is reduced.

Figure 4:
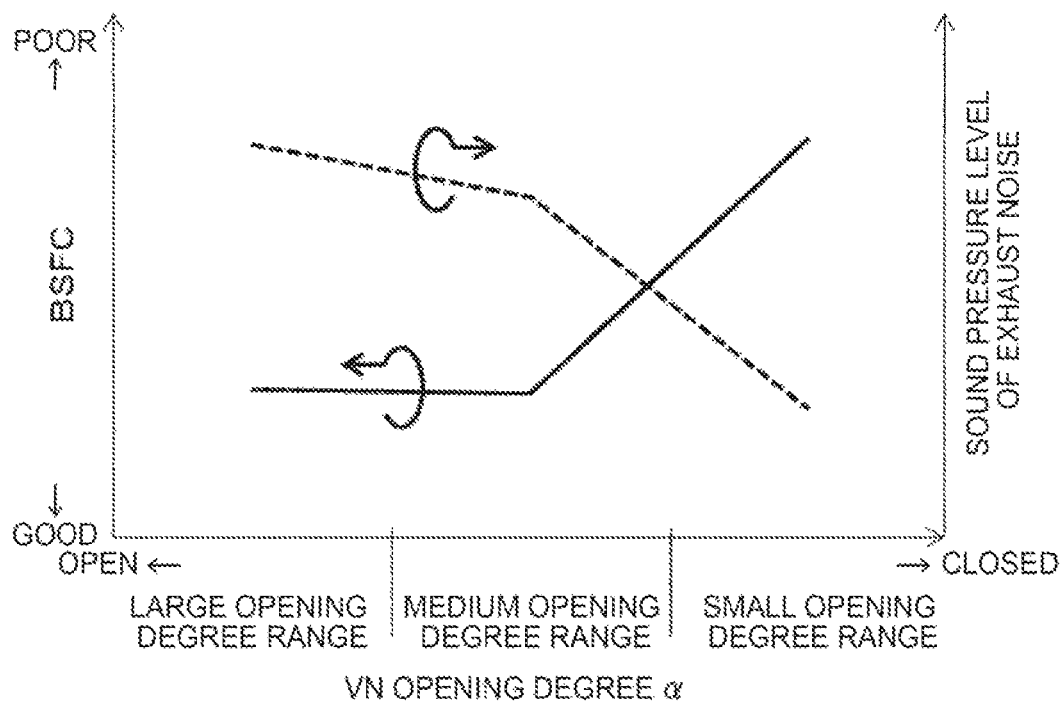
FIG. 4 is a graph indicating an example of the relationship between each of a brake specific fuel consumption (BSFC) and the sound pressure level of exhaust noise and a variable nozzle (VN) opening degree according to the first embodiment.

FIG. 4 is a graph indicating an example of the relationship between each of a brake specific fuel consumption (BSFC) and the sound pressure level of exhaust noise and the VN opening degree α. FIG. 4 indicates the relationship at a constant required air amount Ga and a constant engine rotational speed. FIG. 4 indicates the relationship with the VN opening degree α with the range of opening degree control by the VN actuator 24 divided into three equal parts including a large opening degree range (including the fully-open opening degree), a medium opening degree range, and a small opening degree range (including the fully-closed opening degree), by way of example. In each of the opening degree ranges, the VN opening degree α becomes smaller toward the right side of the drawing sheet.

In the internal combustion engine 10 which includes the variable-capacity turbocharger 12, the amount of exhaust energy collected by the turbine 20 can be efficiently increased by controlling the VN opening degree α to the closed side, and as a result the exhaust noise can be reduced as indicated in FIG. 4. Meanwhile, the pump loss is increased by controlling the VN opening degree α to the closed side. Therefore, basically, the BSFC (fuel efficiency) is degraded by closing the VN 22.

Thus, in the noise-priority mode, in which priority is given to exhaust noise reduction over the fuel efficiency, the amount of exhaust energy collected by the turbine 20 is increased by controlling the VN 22 to the closed side within a range in which degradation in the fuel efficiency is allowed.

Specifically, in the noise-priority mode, as indicated by the dashed line in FIG. 2, the VN 22 starts closing from the fully-open opening degree at a specific required air amount value Ga1, which is small compared to during execution of the fuel efficiency-priority mode, as the required air amount Ga is increased. On the low flow rate side on which the required air amount Ga is equal to or less than the specific required air amount value Ga1, setting of the VN opening degree α and the throttle opening degree θ in the noise-priority mode is the same as that in the fuel efficiency-priority mode.

On the high flow rate side on which the required air amount Ga is more than the specific required air amount value Ga1, meanwhile, the throttle opening degree θ is increased, in order to meet the required air amount Ga, while decreasing the VN opening degree α as the required air amount Ga is increased. More particularly, in the example indicated in FIG. 2, the VN opening degree α is gradually (monotonously) decreased to the fully-closed opening degree and thereafter maintained at the fully-closed opening degree as the required air amount Ga is increased. The air amount range in which the VN 22 and the throttle 28 are controlled in this manner includes a high air amount range R1. As indicated in FIG. 2, the high air amount range R1 is included in the high air amount range on the high flow rate side including the maximum value Gamax, and more particularly an air amount range of the high air amount range on the side of the maximum value Gamax. In the high air amount range R1, the throttle opening degree θ is increased with the VN 22 maintained at the fully-closed opening degree as the required air amount Ga is increased. More particularly, in the example indicated in FIG. 2, the throttle opening degree θ is gradually (monotonously) increased as the required air amount Ga is increased.

FIG. 2 also indicates the relationship between the BSFC (fuel efficiency) and the required air amount Ga. As seen by comparing the waveforms in the continuous line and the dashed line in FIG. 2, both the VN opening degree α and the throttle opening degree θ are controlled to the closed side in the air amount range on the high flow rate side relative to the specific required air amount value Ga1 in the noise-priority mode, compared to the corresponding air amount range in the fuel efficiency-priority mode. Therefore, it is possible to reduce exhaust noise for the reason discussed above in the noise-priority mode, while the BSFC (fuel efficiency) is degraded compared to the fuel efficiency-priority mode.

Figure 5:
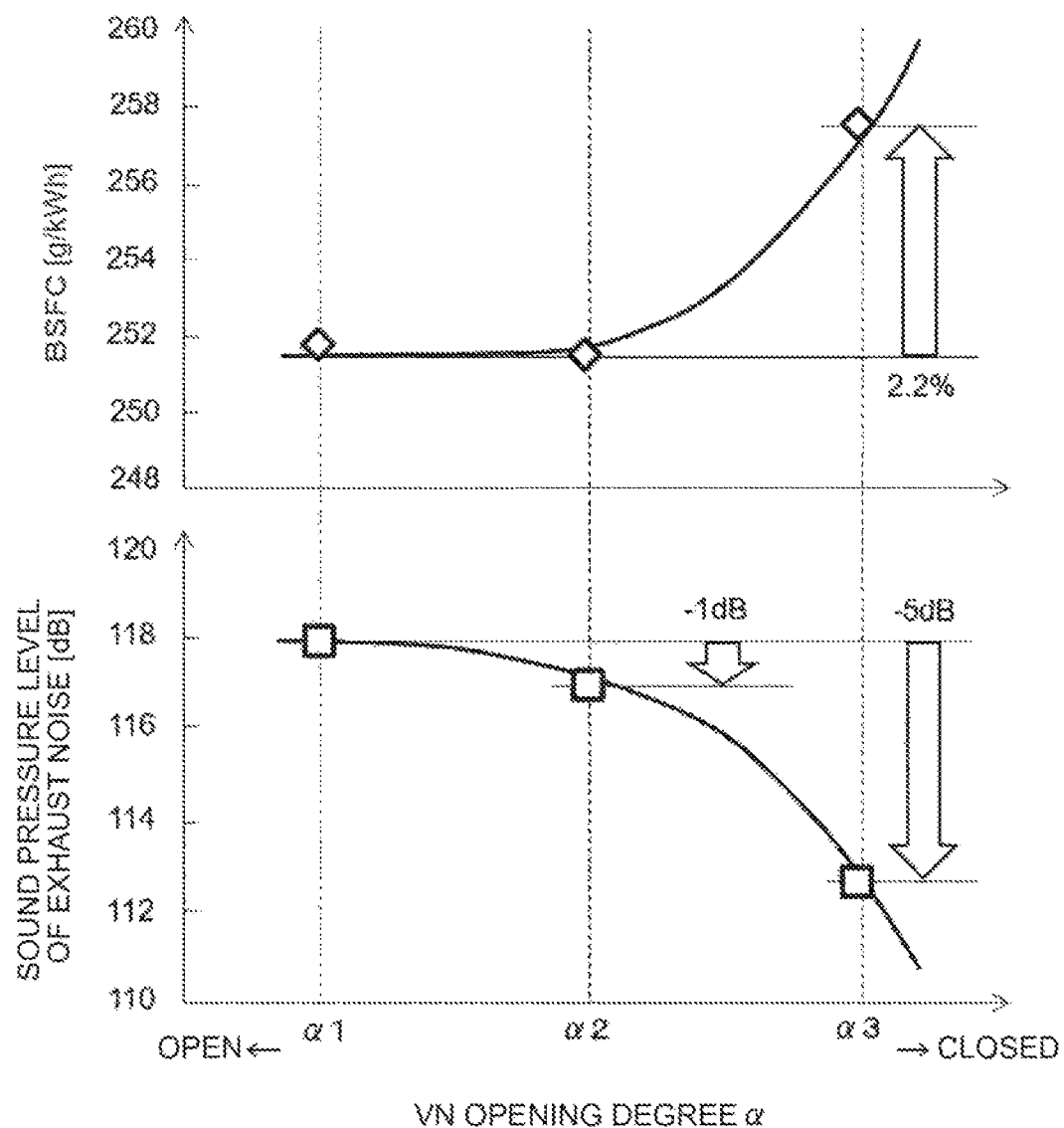
FIG. 5 is a graph for explaining the effect of variation in the VN opening degree toward the closed side on each of the BSFC and the sound pressure level of exhaust noise according to the first embodiment.

FIG. 5 is a graph for explaining the effect of variation in the VN opening degree α toward the closed side on each of the BSFC and the sound pressure level of exhaust noise. FIG. 5 indicates the relationship at a constant required air amount Ga and a constant engine rotational speed. In FIG. 5, three VR opening degree values α1 to α3 (α1>α2>α3) are indicated. In the example indicated in FIG. 5, the BSFC is substantially uniform but the exhaust noise is reduced by 1 dB when the VN 22 is closed from the VN opening degree value α1 to the VN opening degree value α2. When the VN 22 is closed from the VN opening degree value α1 to the VN opening degree value α3, the BSFC is degraded by 2.2%, but the exhaust noise is reduced by 5 dB.

As indicated in FIG. 5, the BSFC (fuel efficiency) and the exhaust noise are in a trade-off relationship relative to variation in the VN opening degree α toward the closed side. That is, the margin of reduction in the exhaust noise achieved by controlling the VN opening degree α to the closed side differs in accordance with how much degradation in the fuel efficiency is allowed. In other words, how much the VN opening degree α can be controlled to the closed side in order to reduce the exhaust noise differs in accordance with how much degradation in the fuel efficiency is allowed. Therefore, by way of example, the VN opening degree α at each required air amount Ga in the noise-priority mode indicated by the dashed line in FIG. 2 discussed above is determined in advance by first determining the allowable range of degradation in the fuel efficiency, and determining the VN opening degree α as a value on the closed side relative to the VN opening degree α in the fuel efficiency-priority mode within such a range that the margin of degradation in the fuel efficiency is accommodated in the allowable range.

Next, the process by the ECU will be described. FIG. 6 is a flowchart illustrating a process related to intake air amount control according to the first embodiment. The process in the flowchart is executed repeatedly during operation of the internal combustion engine 10.

In FIG. 6, the ECU 40 first calculates a required air amount Ga in step S100. Specifically, the ECU 40 calculates, as the required air amount Ga, the amount of air needed to achieve required engine torque that matches the accelerator operation amount which is detected by the accelerator position sensor, for example. After that, the process proceeds to step S102.

In step S102, the ECU 40 determines whether priority is given to exhaust noise reduction over the fuel efficiency. This determination can be made using the following first to third methods, for example.

In the first method, the input device 48 is used. A driver of the vehicle can input one of a noise-priority request to give priority to exhaust noise reduction over the fuel efficiency and a fuel efficiency-priority request to give priority to the fuel efficiency over exhaust noise reduction using the input device 48. When the input device 48 has received a noise-priority request, the ECU 40 determines that priority is given to exhaust noise reduction (step S102: Yes). When the input device 48 has received a fuel efficiency-priority request, on the other hand, the ECU 40 determines that priority is given to the fuel efficiency (step S102: No). That is, with the first method, the control mode for the intake air amount is selected by the driver.

In the second method, information on the present position (present location of travel) of the vehicle acquired using the GNSS receiver 50 is used. When the vehicle is traveling in an urban area or a residential area, for example, the ECU 40 determines that the vehicle is traveling at a location at which priority should be given to exhaust noise reduction over the fuel efficiency (i.e. determines that priority is given to exhaust noise reduction) (step S102: Yes). On the other hand, when the vehicle is traveling in the suburbs, for example, the ECU 40 determines that the vehicle is traveling at a location at which priority should be given to the fuel efficiency over exhaust noise reduction (i.e. determines that priority is given to the fuel efficiency) (step S102: No).

In the second method, the present time band which is acquired using a timer function of the ECU 40 is used. When the present time band is midnight or early morning, for example, the ECU 40 determines that the vehicle is traveling in a time band in which priority should be given to exhaust noise reduction over the fuel efficiency (i.e. determines that priority is given to exhaust noise reduction) (step S102: Yes). On the other hand, when the present time band is daytime, for example, the ECU 40 determines that the vehicle is traveling in a time band in which priority should be given to the fuel efficiency over exhaust noise reduction (i.e. determines that priority is given to the fuel efficiency) (step S102: No). In the second method, only one of the travel location and the time band may be used instead of the example discussed above.

In the third method, the ECU 40 uses the noise meter 36. When a value (typically, sound pressure level) of exhaust noise measured by the noise meter 36 is larger than a predetermined threshold, the ECU 40 determines that priority is given to exhaust noise reduction (step S102: Yes). When the measured value of exhaust noise is equal to or less than the threshold, on the other hand, the ECU 40 determines that priority is given to the fuel efficiency (step S102: No).

When priority is not given to exhaust noise reduction in step S102, the ECU 40 selects the fuel efficiency-priority mode, and the process proceeds to step S104. In step S104, a VN opening degree α is calculated in accordance with the fuel efficiency-priority mode. Specifically, as indicated in FIG. 7A, the memory 40b of the ECU 40 stores a map in which the VN opening degree α is defined by the relationship with the required air amount Ga and the engine rotational speed. The ECU 40 calculates, using the map, a VN opening degree α (target VN opening degree) that matches the present required air amount Ga and engine rotational speed.

FIG. 7A is a graph for use in the fuel efficiency-priority mode, indicating the relationship of the VN opening degree α with the required air amount Ga and the engine rotational speed. FIG. 7A indicates the relationship with the VN opening degree α with the range of opening degree control by the VN actuator 24 divided into three equal parts including a large opening degree range (including the fully-open opening degree), a medium opening degree range, and a small opening degree range (including the fully-closed opening degree). When the relationship indicated in FIG. 7A is seen at the same engine rotational speed, the setting of the VN opening degree α which is indicated by the continuous line in FIG. 2 is obtained at each engine rotational speed. With the setting indicated in FIG. 7A, the value of the required air amount Ga is larger as the engine rotational speed is higher when the VN opening degree α is constant, as indicated by the boundary lines between two adjacent opening degree ranges in FIG. 7A.

Figure 8A:
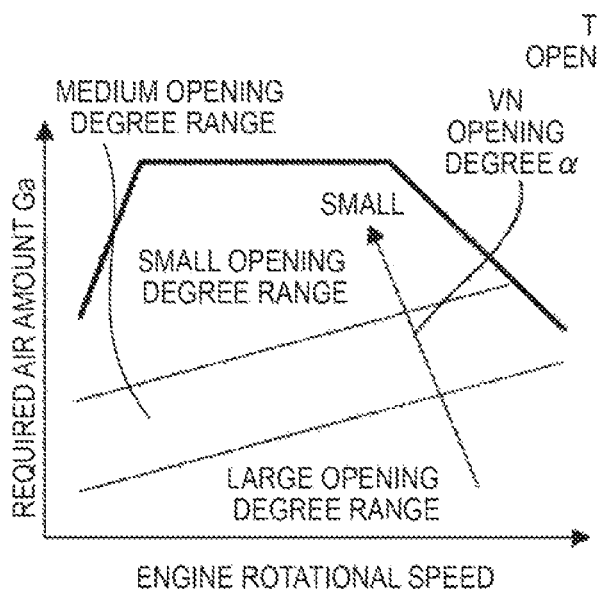
FIG. 8A is a graph for the noise-priority mode, indicating the relationship of the VN opening degree with the required air amount and the engine rotational speed.

When priority is given to exhaust noise reduction in step S102, on the other hand, the ECU 40 selects the noise-priority mode, and the process proceeds to step S106. In step S106, a VN opening degree α is calculated in accordance with the noise-priority mode. Specifically, as indicated in FIG. 8A, the memory 40b stores a map in which the VN opening degree α is defined by the relationship with the required air amount Ga and the engine rotational speed. The ECU 40 calculates, using the map, a VN opening degree α (target VN opening degree) that matches the present required air amount Ga and engine rotational speed.

FIG. 8A is a graph for use in the noise-priority mode, indicating the relationship of the VN opening degree α with the required air amount Ga and the engine rotational speed. The difference of the setting indicated in FIG. 8A from the setting indicated in FIG. 7A will be described. As described already, the VN opening degree α (see the dashed line in FIG. 2) at each required air amount Ga which is used in the noise-priority mode is determined as a value on the closed side relative to the VN opening degree α (see the continuous line in FIG. 2) which is used in the fuel efficiency-priority mode, in consideration of the allowable margin of degradation in the fuel efficiency, on the high flow rate side relative to the specific required air amount value Ga1. Based on the difference between the waveforms of the VN opening degree α in the continuous line and the dashed line in FIG. 2, the medium opening degree range in FIG. 8A has been shifted to the low air amount side compared to the medium opening degree range indicated in FIG. 7A. As a result, the large opening degree range in FIG. 8A has been reduced to the low air amount side compared to the large opening degree range in FIG. 7A. In addition, the small opening degree range in FIG. 8A has been extended to the small air amount side compared to the small opening degree range in FIG. 7A.

In step S108 which follows step S104 or S106, the ECU 40 calculates a throttle opening degree θ. Specifically, when the process proceeds to step S108 after step S104, the ECU 40 calculates a throttle opening degree θ in accordance with the fuel efficiency-priority mode. Specifically, as indicated in FIG. 7B, the memory 40b stores a map in which the throttle opening degree θ is defined by the relationship with the required air amount Ga and the engine rotational speed. The ECU 40 calculates, using the map, a throttle opening degree θ (target throttle opening degree) that matches the present required air amount Ga and engine rotational speed.

FIG. 7B is a graph for use in the fuel efficiency-priority mode, indicating the relationship of the throttle opening degree θ with the required air amount Ga and the engine rotational speed. FIG. 7B indicates the relationship with the throttle opening degree θ with the range of opening degree control by the throttle 28 divided into three equal parts including a large opening degree range (including the fully-open opening degree), a medium opening degree range, and a small opening degree range (including the fully-closed opening degree). When the relationship indicated in FIG. 7B is seen at the same engine rotational speed, the setting of the throttle opening degree θ which is indicated by the continuous line in FIG. 2 is obtained at each engine rotational speed. With the setting indicated in FIG. 7B, the value of the required air amount Ga is larger as the engine rotational speed is higher when the throttle opening degree θ is constant, as indicated by the boundary lines between two adjacent opening degree ranges in FIG. 7B.

Figure 8B:
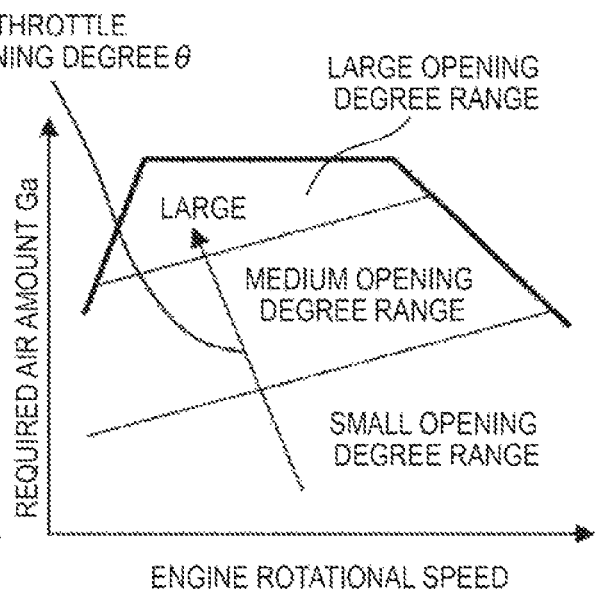
FIG. 8B is a graph for the noise-priority mode, indicating the relationship of the throttle opening degree with the required air amount and the engine rotational speed.

When the process proceeds to step S108 after step S106, meanwhile, the ECU 40 calculates a throttle opening degree θ in accordance with the noise-priority mode in step S108. Specifically, as indicated in FIG. 8B, the memory 40b stores a map in which the throttle opening degree θ is defined by the relationship with the required air amount Ga and the engine rotational speed. The ECU 40 calculates, using the map, a throttle opening degree θ (target throttle opening degree) that matches the present required air amount Ga and engine rotational speed.

FIG. 8B is a graph for use in the noise-priority mode, indicating the relationship of the throttle opening degree θ with the required air amount Ga and the engine rotational speed. The difference of the setting indicated in FIG. 8B from the setting indicated in FIG. 7B will be described. Based on the difference between the waveforms of the throttle opening degree θ in the continuous line and the dashed line in FIG. 2 discussed above, the medium opening degree range in FIG. 8B has been extended to the high air amount side compared to the medium opening degree range indicated in FIG. 7B. As a result, the large opening degree range in FIG. 8B has been reduced to the high air amount side compared to the large opening degree range in FIG. 7B. On the other hand, the small opening degree range in FIG. 8B is equivalent to the small opening degree range in FIG. 7B.

By the process in step S108 discussed above, a throttle opening degree θ needed to meet the required air amount Ga at the VN opening degree α calculated in step S104 or S106 is calculated.

The ECU 40 controls the VN actuator 24 and the throttle 28 so as to achieve the VN opening degree α and the throttle opening degree θ which are calculated through the process in the flowchart indicated in FIG. 6.

Next, the effect will be described. In the noise-priority mode according to the first embodiment described above, the throttle opening degree θ is increased with the VN 22 maintained at the fully-closed opening degree as the required air amount Ga is increased in the high air amount range R1 including the maximum value Gamax of the required air amount Ga. That is, in the high air amount range R1 (high-load range), the intake air amount is controlled by the throttle 28 so as to meet the required air amount Ga with the exhaust passage 18 narrowed by the VN 22 (more particularly, with the exhaust passage 18 narrowed compared to the fuel efficiency-priority mode). Therefore, it is possible to achieve required engine torque while reducing exhaust noise.

With the first embodiment, as described above, it is possible to achieve required engine torque while suppressing exhaust noise in the high-load range using intake air amount control including control of the VN opening degree α. Incidentally, exhaust noise due to the combustion primary component of combustion discussed above has a low frequency. If it is attempted to reduce such exhaust noise using the muffler 32, the size of the muffler 32 may be increased, or the pressure loss of the exhaust passage 18 may be increased. With the first embodiment, in contrast, the exhaust noise can be reduced using intake air amount control including control of the VN opening degree α, and thus the first embodiment is superior from the viewpoint of the mountability of exhaust components on the vehicle and the reduction in the pressure loss of the exhaust passage 18.

In the intake air amount control according to the first embodiment, the fuel efficiency-priority mode can also be selected in addition to the noise-priority mode. In the fuel efficiency-priority mode, the VN opening degree α is decreased with the throttle 28 maintained at the fully-open opening degree as the required air amount Ga is increased in the high air amount range R1. Therefore, not only exhaust noise can be suppressed by selecting the noise-priority mode as discussed above, but also required engine torque can be achieved while achieving low fuel consumption in a state in which the resistance of the exhaust passage is low (i.e. the pump loss is suppressed to be low) in the high-load range by selecting the fuel efficiency-priority mode.

In the first embodiment, switching between the noise-priority mode and the fuel efficiency-priority mode discussed above can be made in accordance with a request from the driver of the vehicle using the input device 48. In the first embodiment, in addition, mode switching can be made automatically to one of the noise-priority mode and the fuel efficiency-priority mode that is suitable for the location and the time band of travel of the vehicle. More particularly, the noise-priority mode can be selected automatically at a travel location at which exhaust noise reduction is desired, such as in urban areas, and in a time band in which exhaust noise reduction is desired, such as at midnight. In the first embodiment, further, the noise-priority mode can be selected automatically by using the noise meter 36 when exhaust noise actually emitted from the exhaust port 34 is large.

Figure 9:
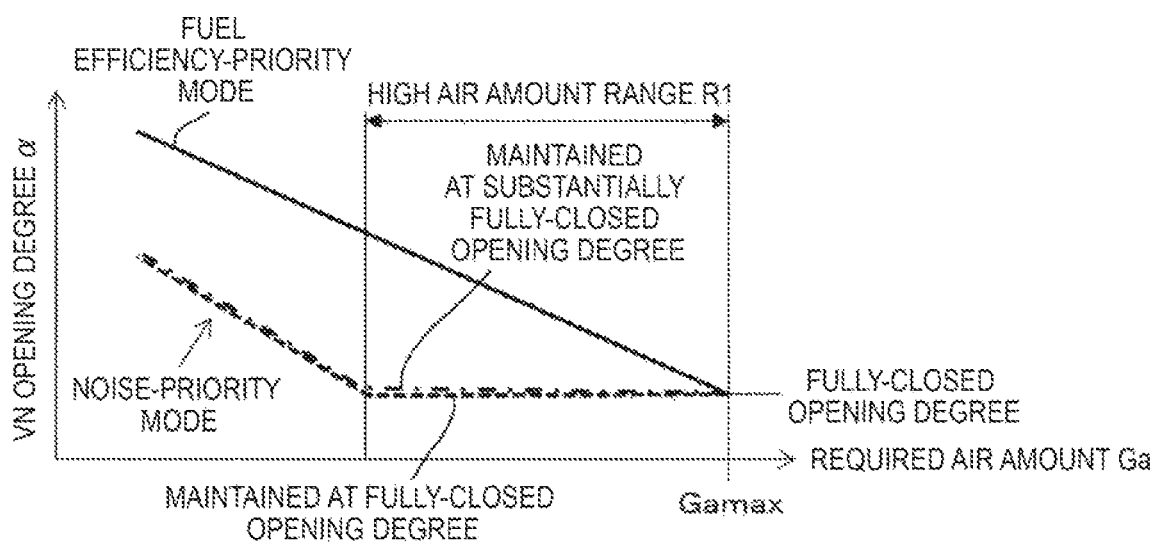
FIG. 9 is a graph for explaining another example of setting of the VN opening degree for use in the noise-priority mode according to the first embodiment.

Next, another example of the setting of the VN opening degree α will be described. FIG. 9 is a graph for explaining another example of the setting of the VN opening degree α for use in the noise-priority mode according to the first embodiment. The example indicated in FIG. 9 differs from the example indicated in FIG. 2 in the setting of the VN opening degree α in the high air amount range R1. Specifically, in the example (dashed line) indicated in FIG. 2, the VN 22 is maintained at the fully-closed opening degree as the required air amount Ga is increased in the high air amount range R1. In the example (long dashed short dashed line) indicated in FIG. 9, in contrast, the VN opening degree α in the high air amount range R1 is set so as to be decreased with a slight slope as the required air amount Ga is increased so as to reach the fully-closed opening degree at the maximum value Gamax, to be exact. With such variations in the VN opening degree α with a slight slope, the VN 22 is considered as being maintained at a substantially fully-closed opening degree as the required air amount Ga is increased. The VN opening degree α in the high air amount range R1 for use in the noise-priority mode may be set so as to be maintained at a substantially fully-closed opening degree as the required air amount Ga is increased, as in the example indicated by the long dashed short dashed line in FIG. 9.

Next, a second embodiment will be described. The second embodiment differs from the first embodiment in the setting of the VN opening degree α and the throttle opening degree θ relative to the required air amount Ga made when the noise-priority mode is executed using the VN opening degree α and the throttle opening degree θ.

Figure 10:
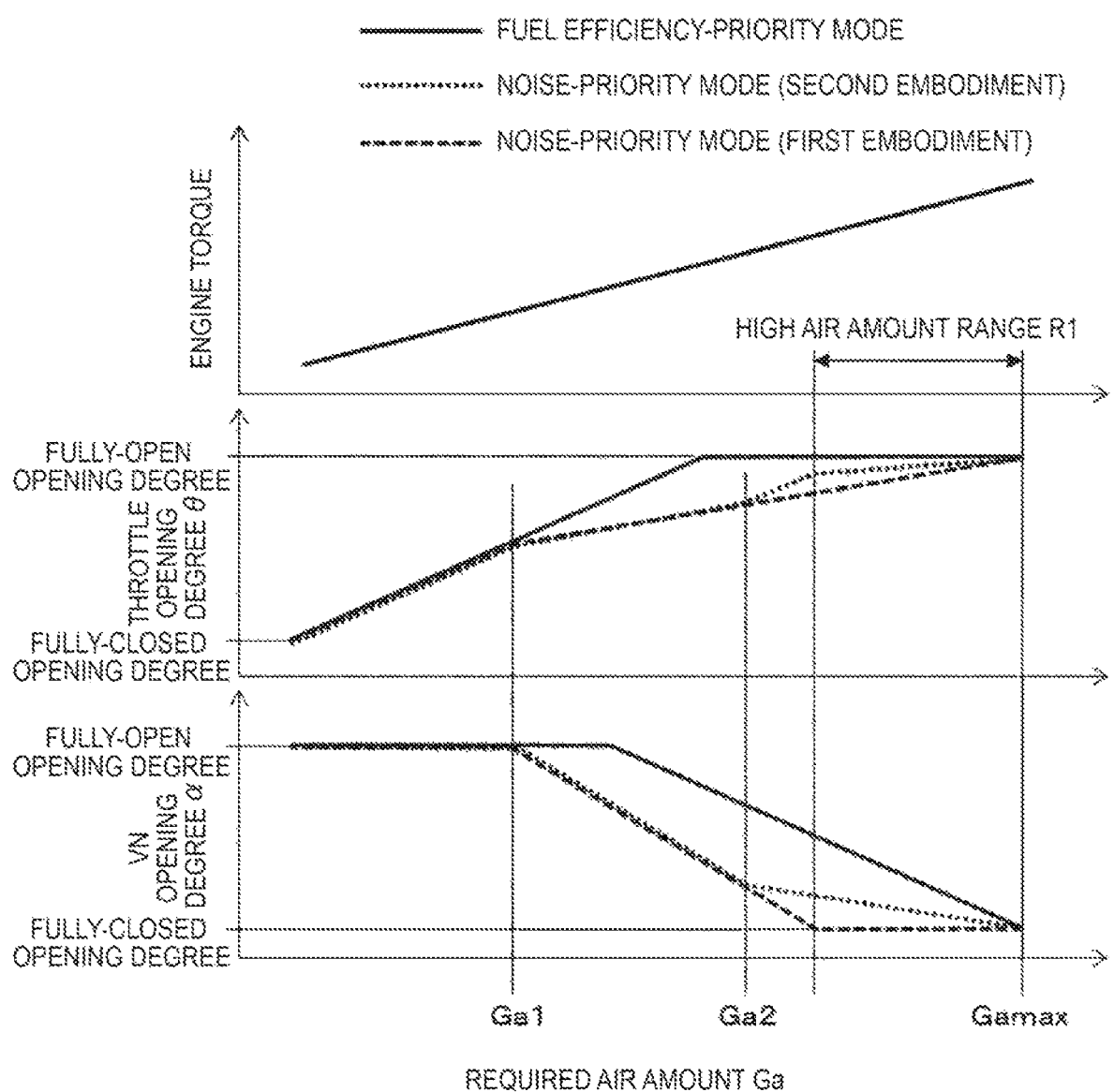
FIG. 10 is a graph for explaining a fuel efficiency-priority mode and a noise-priority mode according to a second embodiment of the present disclosure.

FIG. 10 is a graph for explaining the fuel efficiency-priority mode and the noise-priority mode according to the second embodiment. The setting of the VN opening degree α and the throttle opening degree θ in the fuel efficiency-priority mode is the same as that according to the first embodiment.

In the noise-priority mode, as indicated in FIG. 10, the VN 22 starts closing at the specific required air amount value Ga1 as the required air amount Ga is increased also in the second embodiment, as in the first embodiment.

In the first embodiment, on the high flow rate side relative to the specific required air amount value Ga1, the VN opening degree α is gradually (monotonously) decreased to the fully-closed opening degree as the required air amount Ga is increased. In the second embodiment, in contrast, the VN opening degree α is gradually decreased as the required air amount Ga is increased, and thereafter gradually decreased toward the fully-closed opening degree on the high flow rate side relative to a required air amount value Gat Gamax) before reaching the fully-closed opening degree, with a gentle slope compared to the low flow rate side, as the required air amount Ga is increased. The throttle opening degree θ is adjusted so as to meet the required air amount Ga with the setting of the VN opening degree α changed compared to the first embodiment in this manner.

In FIG. 10, the high air amount range R1 that is the same as that indicated in FIG. 2 is used as an example of the "high air amount range" according to the present disclosure. In the noise-priority mode according to the second embodiment, in the high air amount range R1, the throttle opening degree θ is increased with the VN opening degree α decreased as the required air amount Ga is increased. More particularly, in the example indicated in FIG. 10, in the high air amount range R1, the throttle opening degree θ is increased with the VN opening degree α decreased, until the required air amount Ga reaches the maximum value Gamax, as the required air amount Ga is increased.

With the setting in the noise-priority mode indicated in FIG. 10 discussed above, the VN opening degree α is on the open side compared to the setting according to the first embodiment in the high air amount range R1 and a high air amount range (high-load range) around the high air amount range R1, and the throttle opening degree θ is increased accordingly. As a result, the fuel efficiency is improved by a reduction in the pump loss, while the margin of reduction in exhaust noise is decreased, compared to the setting according to the first embodiment.

The margin of degradation in the fuel efficiency allowed when the VN opening degree α is set on the closed side in the noise-priority mode compared to the fuel efficiency-priority mode occasionally differs in accordance with the engine operation condition. The setting in the noise-priority mode indicated in FIG. 10 is suitable for use under an engine operation condition under which the margin of degradation in the fuel efficiency allowed in a high air amount range such as the high air amount range R1 is small. In the noise-priority mode, incidentally, the setting indicated in FIG. 10 may be used under an engine operation condition under which the margin of degradation in the fuel efficiency allowed in the high air amount range is relatively small, and the setting indicated in FIG. 2 may be used under an engine operation condition under which the margin of degradation in the fuel efficiency allowed is relatively large, for example.

Also with the setting of the VN opening degree α made in accordance with the noise-priority mode according to the second embodiment described above, the VN opening degree α is controlled to the closed side in the high air amount range R1 compared to the fuel efficiency-priority mode, as in the first embodiment. Therefore, it is possible to achieve required engine torque while reducing exhaust noise also in the noise-priority mode according to the second embodiment.

Figure 11:
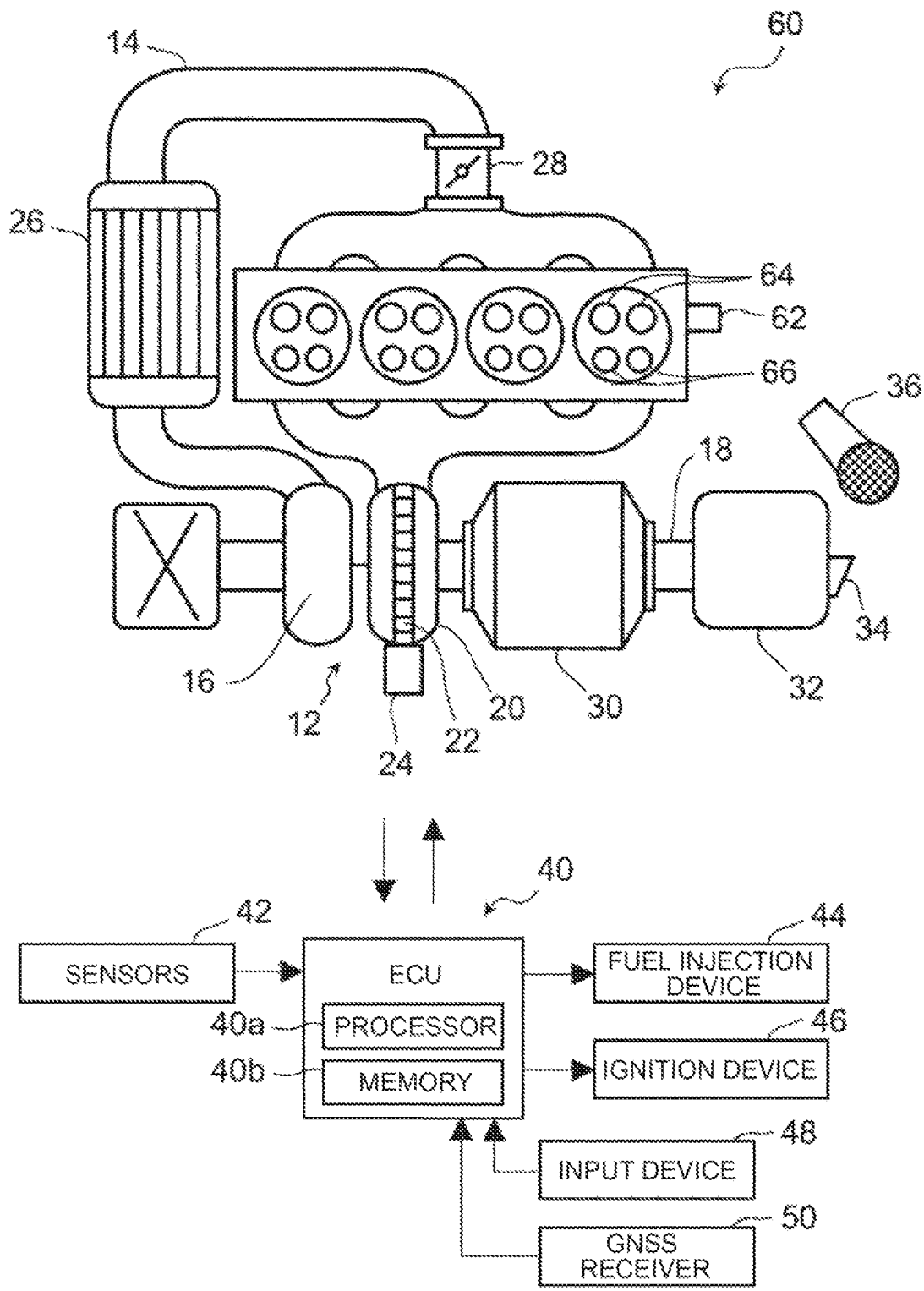
FIG. 11 is a schematic diagram illustrating an example of the system configuration of an internal combustion engine according to a third embodiment of the present disclosure.

Next, a third embodiment will be described. FIG. 11 is a schematic diagram illustrating an example of the system configuration of an internal combustion engine 60 according to the third embodiment. The internal combustion engine 60 differs from the internal combustion engine 10 illustrated in FIG. 1 in additionally including a variable valve drive mechanism 62. The variable valve drive mechanism 62 is configured to be able to change the valve opening characteristics of intake valves 64 for the cylinders (e.g. the lift amount, opening timing, and closing timing of the intake valves 64).

In intake air amount control (fuel efficiency-priority mode and noise-priority mode) according to the third embodiment, the variable valve drive mechanism 62 is used together with the throttle 28, in order to control the intake air amount so as to meet the required air amount Ga with the VN opening degree α matching the required air amount Ga. For such intake air amount control, a variable valve drive mechanism that is able to change the valve opening characteristics of exhaust valves 66 may be used together with the variable valve drive mechanism 62.

Figure 12:
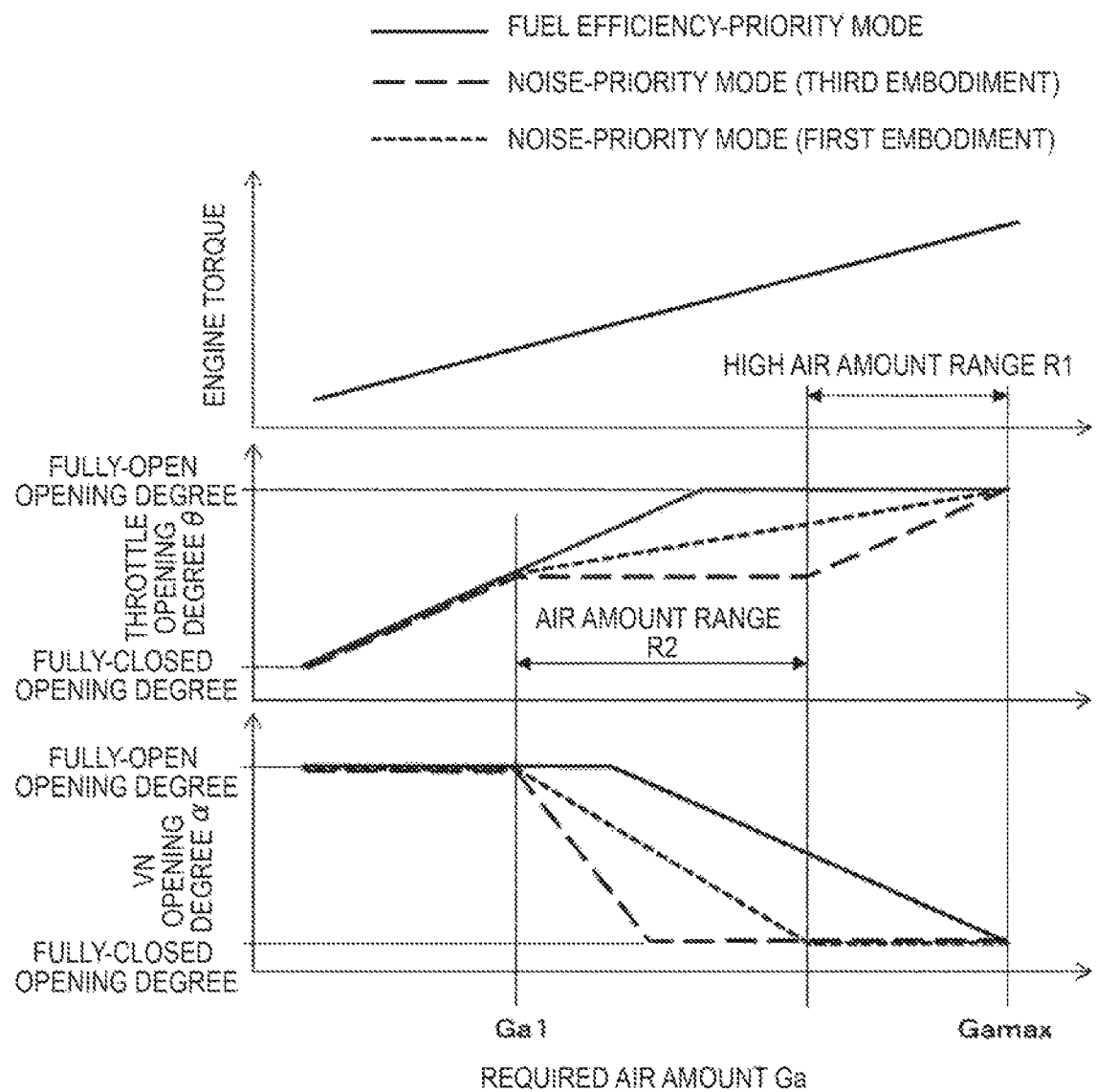
FIG. 12 is a graph for explaining a fuel efficiency-priority mode and a noise-priority mode according to the third embodiment.

FIG. 12 is a graph for explaining the fuel efficiency-priority mode and the noise-priority mode according to the third embodiment. The setting of the VN opening degree α and the throttle opening degree θ in the fuel efficiency-priority mode is the same as that according to the first embodiment.

In the noise-priority mode, as indicated in FIG. 12, the VN 22 starts closing at the specific required air amount value Ga1 as the required air amount Ga is increased also in the third embodiment, as in the first embodiment.

Also in the third embodiment, as in the first embodiment, on the high flow rate side relative to the specific required air amount value Ga1, the VN opening degree α is gradually (monotonously) decreased to the fully-closed opening degree as the required air amount Ga is increased. The difference between the two embodiments is the slope of the decrease in the VN opening degree α relative to the increase in the required air amount Ga. That is, in the third embodiment, as indicated in FIG. 12, the VN opening degree α is decreased toward the fully-closed opening degree with a high slope compared to the first embodiment.

With the setting of the VN opening degree α in the noise-priority mode according to the third embodiment discussed above, the air amount range (load range) in which the VN 22 is used at the fully-closed opening degree can be extended to the low flow rate side (low load side) compared to the setting according to the first embodiment. Thus, the setting of the VN opening degree α according to the third embodiment is suitable for use in the case where the engine load range in which there is a need for exhaust noise reduction extends to the lower load side.

Incidentally, the air amount range in which the VN 22 is used at the fully-closed opening degree can be extended, while keeping the above slope equivalent to that according to the first embodiment, by shifting the specific required air amount value Ga1 to the low flow rate side, for example, instead of the setting of the VN opening degree α according to the third embodiment. With this method, however, the air amount range in which the VN 22 is closed with respect to the fully-open opening degree is extended to the low flow rate side compared to the setting indicated in FIG. 12. This incurs degradation in the fuel efficiency in a small air amount range (low load range) in which there is a high demand to reduce the pump loss for improving the fuel efficiency. In addition, the value of exhaust noise itself is small in the small air amount range compared to the high air amount side. Thus, with the setting of the VN opening degree α according to the third embodiment, it is possible to enhance the effect of exhaust noise reduction while considering such issues.

In the noise-priority mode according to the third embodiment, the throttle opening degree θ and the valve opening characteristics of the intake valves 64 are controlled so as to meet the required air amount Ga with the VN opening degree α set as discussed above. Specifically, only control of the throttle opening degree θ that is similar to that according to the first embodiment is executed, by way of example, on the low flow rate side on which the required air amount Ga is equal to or less than the specific required air amount value Ga1.

Meanwhile, an air amount range R2 is present on the high flow rate side relative to the specific required air amount value Ga1 and on the low flow rate side of the high air amount range R1. In the air amount range R2, the valve opening characteristics of the intake valves 64 are controlled by the variable valve drive mechanism 62 so as to meet the required air amount Ga, with the VN opening degree α and the throttle opening degree θ kept constant (or substantially constant), as the required air amount Ga is increased. More particularly, at least one of the lift amount, opening timing, and closing timing of the intake valves 64, for example, is controlled so as to increase the intake air amount as the required air amount Ga is increased.

Also with the setting of the VN opening degree α made in accordance with the noise-priority mode according to the third embodiment described above, the VN opening degree α is controlled to the closed side in the high air amount range R1 compared to the fuel efficiency-priority mode, as in the first embodiment. Therefore, it is possible to achieve required engine torque while reducing exhaust noise also in the noise-priority mode according to the third embodiment.

Incidentally, also in the setting of the VN opening degree α in the noise-priority mode according to the third embodiment (see FIG. 12), as discussed above with reference to FIG. 9 in relation to the first embodiment, the VN opening degree α may be controlled so as to be substantially maintained at the fully-closed opening degree, instead of being maintained exactly at the fully-closed opening degree, as the required air amount Ga is increased.

In addition, the variable valve drive mechanism 62, which is used together with the throttle 28 so as to meet the required air amount Ga at the VN opening degree α which is set in the noise-priority mode, may be applied to not only the noise-priority mode according to the third embodiment, but also the noise-priority mode according to the first embodiment and the second embodiment, while exercising caution as follows. That is, in the noise-priority mode indicated in FIG. 2, the variable valve drive mechanism 62 may be used together with the throttle 28, in order to meet the required air amount Ga, on condition that setting that increases the throttle opening degree θ with the VN 22 maintained at the fully-closed opening degree as the required air amount Ga is increased in the high air amount range R1 is kept. In the noise priority mode indicated in FIG. 10, meanwhile, the variable valve drive mechanism 62 may be used together with the throttle 28, in order to meet the required air amount Ga, on condition that setting that increases the throttle opening degree θ with the VN opening degree α decreased as the required air amount Ga is increased in the high air amount range R1 is kept.

Next, a fourth embodiment will be described. A method of correcting the VN opening degree α so as to increase the amount of closure of the VN opening degree α in the noise-priority mode without degrading the fuel efficiency under an engine operation condition under which the ignition timing can be advanced so as to be closer to an optimum ignition timing (Minimum advance for the Best Torque (MBT)) will be described in relation to the fourth embodiment. In the following description, the VN opening degree α is set as in the noise-priority mode indicated in FIG. 2 according to the first embodiment. However, this correction method is similarly applicable to the setting of the VN opening degree α in the noise-priority mode indicated in FIGS. 10 and 12 according to the second and third embodiments, respectively.

Specifically, when the noise-priority mode is selected under an engine operation condition under which a basic ignition timing on the retarded side relative to the MBT ignition timing is selected, the ECU 40 which uses the method of correcting the VN opening degree α according to the fourth embodiment controls the ignition device 46 so as to advance an ignition timing SA from a basic ignition timing SAb so as to be closer to the MBT ignition timing, and corrects the VN opening degree α which is set in the noise-priority mode to the closed side by such an amount that cancels a fuel efficiency improvement margin (ΔBSFC to be discussed later) due to the advancement of the ignition timing SA. Incidentally, the VN opening degree α to be corrected by the correction method is the VN opening degree α in the air amount range in which the VN opening degree α is gradually decreased from the fully-open opening degree to the fully-closed opening degree as the required air amount Ga is increased in the example indicated in FIG. 2.

Figure 13:
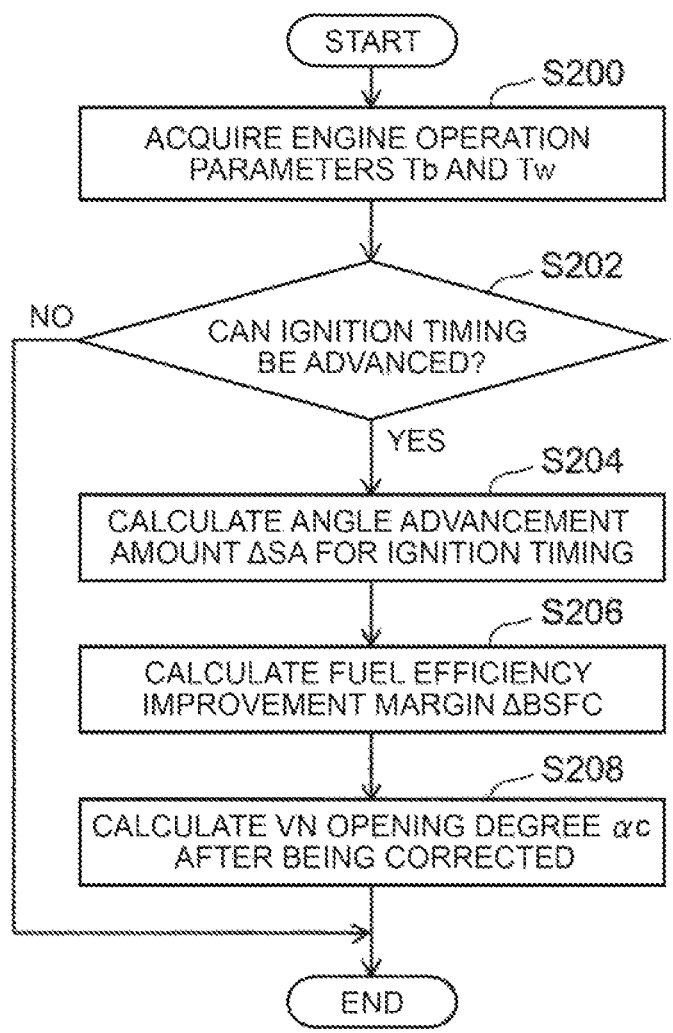
FIG. 13 is a flowchart illustrating a process of calculating the VN opening degree in the noise-priority mode using a method of correcting the VN opening degree according to a fourth embodiment of the present disclosure.

FIG. 13 is a flowchart illustrating a process of calculating the VN opening degree α in the noise-priority mode using the method of correcting the VN opening degree α according to the fourth embodiment. The process in this flowchart is executed in conjunction with the process in step S106 in the flowchart indicated in FIG. 6 discussed above.

In FIG. 13, the ECU 40 first acquires operation state parameters of the internal combustion engine 10 in step S200. Herein, the operation state parameters are parameters that affect the ignition timing (e.g. an engine coolant temperature Tw and an intake air temperature Tb). The engine coolant temperature Tw and the intake air temperature Tb are detected using an engine coolant temperature sensor and an intake air temperature sensor, for example. After that, the process proceeds to step S202.

In step S202, the ECU 40 determines whether the engine is under an engine operation condition under which the ignition timing SA can be advanced so as to be closer to the MBT ignition timing.

Figure 14:
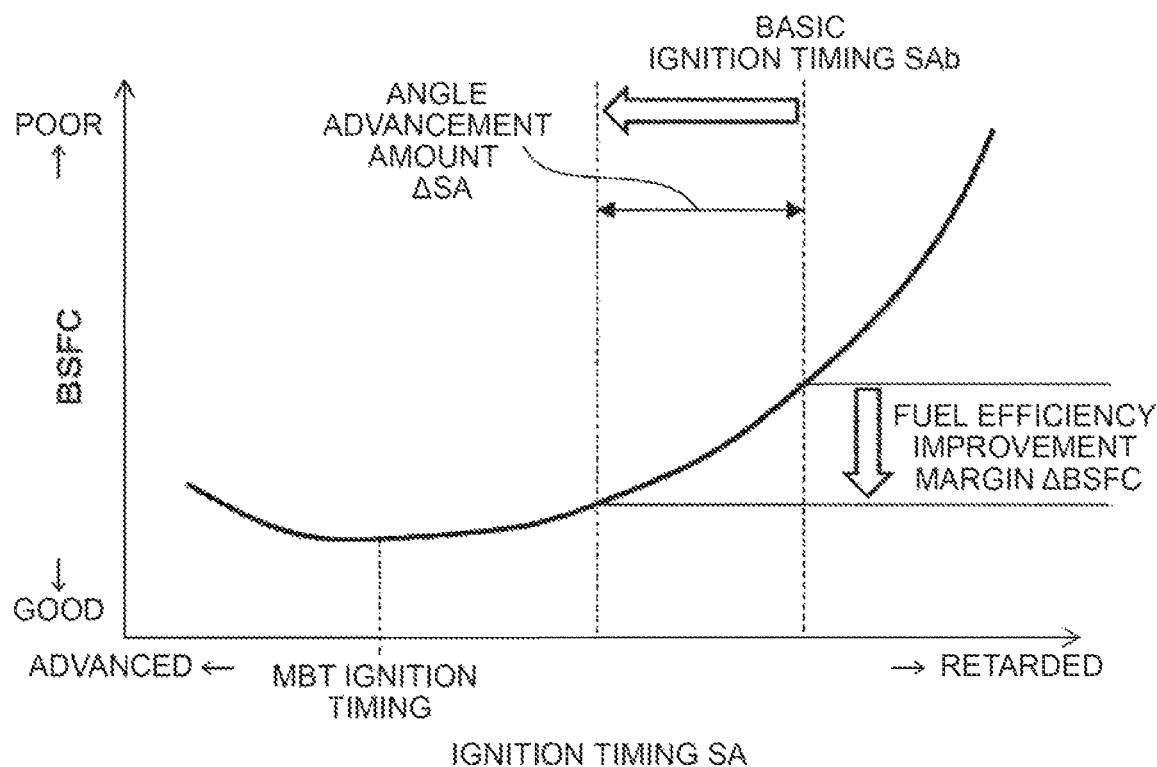
FIG. 14 is a graph indicating the relationship between the BSFC and an ignition timing according to the fourth embodiment.

FIG. 14 is a graph indicating the relationship between the BSFC and the ignition timing SA. As indicated in FIG. 14, the BSFC (fuel efficiency) is at its best at the MBT ignition timing. FIG. 14 corresponds to an example of an engine operation condition under which the result of the determination in step S202 is positive. That is, the basic ignition timing (typically, a value that matches the engine load and the engine rotational speed) SAb under the engine operation condition corresponding to FIG. 14 is positioned on the retarded side relative to the MBT ignition timing. Therefore, there is room for correcting the ignition timing SA with respect to the basic ignition timing SAb so as to be closer to the MBT ignition timing, as a result of which the BSFC can be improved.

When the ignition timing SA is advanced, on the other hand, knock tends to be caused. Therefore, in step S202, in addition to determining whether there is room for advancing the ignition timing, it is determined whether the engine is under an engine operation condition under which the ignition timing can be advanced without degrading the occurrence of knock. Specifically, the result of the latter determination is positive when the engine coolant temperature Tw is less than a predetermined value since the engine is being warmed up, for example. In addition, the result of the latter determination is also positive when there is an allowance in the capacity of the intercooler 26 with the vehicle traveling at a high speed, for example, since the intake air temperature Tb can be lowered from the present detection value.

When the results of the two determinations in step S202 are positive, the ECU 40 finally determines that the ignition timing can be advanced, and the process proceeds to step S204. When one or both of the results of the two determinations are negative, on the other hand, the ECU 40 finally determines that the ignition timing cannot be advanced, and the process in the flowchart indicated in FIG. 13 is ended. In this case, as described already with reference to step S106, the VN opening degree α is calculated from the relationship (map) indicated in FIG. 8A which corresponds to the setting of the VN opening degree α indicated in FIG. 2.

In step S204, the ECU 40 calculates an angle advancement amount ΔSA for the ignition timing SA. The angle advancement amount ΔSA is calculated based on a difference ΔTw between the basic value (a value associated with the basic ignition timing SAb) and the present value (a value acquired in step S200) of the engine coolant temperature Tw, for example. Specifically, the angle advancement amount ΔSA is calculated so as to be larger as the difference ΔTw is larger, for example. After that, the process proceeds to step S206.

In step S206, the ECU 40 calculates a fuel efficiency improvement margin ΔBSFC that matches the calculated angle advancement amount ΔSA. The fuel efficiency improvement margin ΔBSFC can be calculated using the relationship between the BSFC and the ignition timing SA such as that indicated in FIG. 14. More particularly, the relationship is varied in accordance with each of the required air amount Ga (engine load) and the engine rotational speed. Therefore, the memory 40b stores a map that defines the relationship between the ignition timing SA, the required air amount Ga, and the engine rotational speed and the BSFC. The ECU 40 calculates, using the map, a fuel efficiency improvement margin ΔBSFC that matches the present angle advancement amount ΔSA, required air amount Ga, and engine rotational speed. After that, the process proceeds to step S208.

In step S208, the ECU 40 calculates a VN opening degree ac corrected to the closed side from a basic VN opening degree ab for the noise-priority mode by such an amount that cancels the calculated fuel efficiency improvement margin ΔBSFC. Herein, the basic VN opening degree ab corresponds to the VN opening degree α calculated from the relationship (map) indicated in FIG. 8A corresponding to the setting of the VN opening degree α indicated in FIG. 2.

Figure 15:
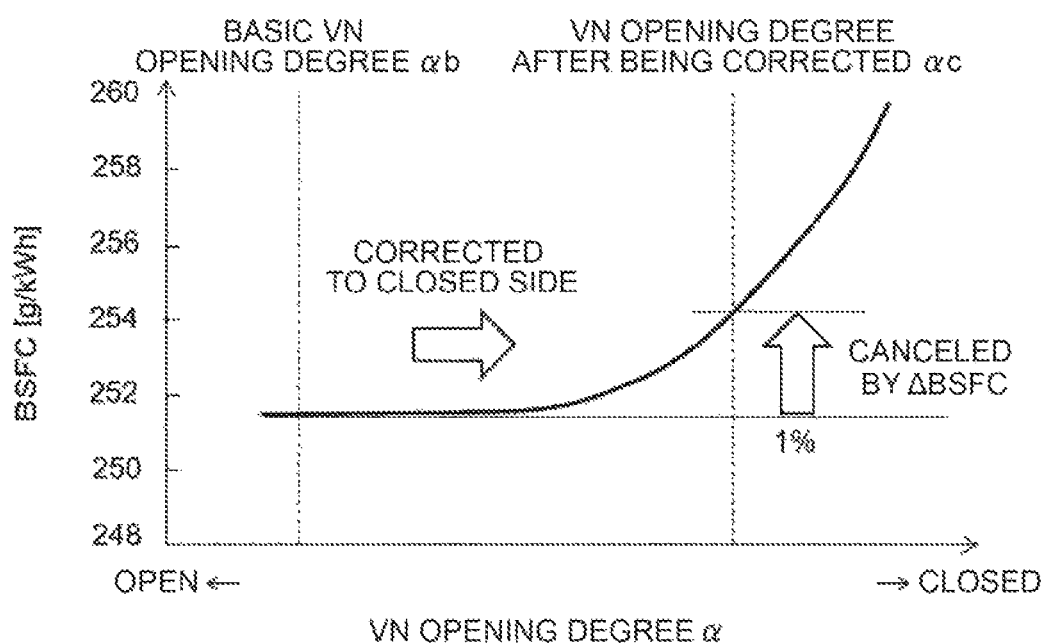
FIG. 15 is a graph indicating the relationship between the BSFC and the VN opening degree $\alpha$ for use in step S208 indicated in the flowchart in FIG. 13.

FIG. 15 is a graph indicating the relationship between the BSFC and the VN opening degree α for use in step S208. As discussed already, when the VN opening degree α is moved to the closed side, the BSFC (fuel efficiency) is basically degraded by an increase in the pump loss. Thus, the VN opening degree ac at which the fuel efficiency is degraded by the fuel efficiency improvement margin ΔBSFC with respect to the value of the BSFC at the basic VN opening degree ab can be specified using the relationship indicated in FIG. 15. More particularly, the relationship is varied in accordance with each of the required air amount Ga (engine load) and the engine rotational speed. Therefore, the memory 40b stores a map that defines the relationship between the BSFC and the VN opening degree α as a map that is different in accordance with the required air amount Ga and the engine rotational speed. The ECU 40 calculates, using the map, a VN opening degree ac positioned on the closed side with respect to the basic VN opening degree ab by such an amount that cancels the fuel efficiency improvement margin ΔBSFC.

The ECU 40 controls the ignition device 46 so as to achieve the ignition timing SA which is advanced from the basic ignition timing SAb by the angle advancement amount ΔSA which is calculated through the process in the flowchart indicated in FIG. 13, and controls the VN actuator 24 so as to achieve the VN opening degree ac which is calculated through the process in the flowchart (i.e. after being corrected).

With the method of correcting the VN opening degree α according to the fourth embodiment described above, it is possible to increase the amount of closure of the VN opening degree α which is used in the noise-priority mode (by the difference between the basic VN opening degree ab and the VN opening degree ac after being corrected) without degrading the fuel efficiency under an engine operation condition under which the ignition timing SA can be advanced so as to be closer to the MBT ignition timing.

Therefore, it is possible to enhance the effect of reducing exhaust noise using the noise-priority mode without degrading the fuel efficiency.

Incidentally, under a low engine coolant temperature condition which is one of the above engine operation conditions, engine noise (mechanical noise) is large because of an increase in engine friction, and combustion noise is large because of an increase in the required air amount Ga due to the increase in the engine friction. In this respect, the noise level for the entire vehicle can be reduced by reducing exhaust noise using the VN opening degree ac after being corrected by the correction method according to the fourth embodiment under the low engine coolant temperature condition.

What is claimed is:

1. A control device for an internal combustion engine including a variable-capacity turbocharger that includes a turbine with a variable nozzle and an actuator configured to control a variable nozzle opening degree, and a throttle disposed in an intake passage, the control device comprising an electronic control unit configured to:
   include a first control mode as one of control modes for an intake air amount; and
   when an air amount range on a high flow rate side including a maximum value of a required air amount for the internal combustion engine is defined as a high air amount range, control the actuator and the throttle so as to increase a throttle opening degree while maintaining the variable nozzle at a fully-closed opening degree or a substantially fully-closed opening degree, or while decreasing the variable nozzle opening degree, as the required air amount is increased in the high air amount range on a side of the maximum value in the first control mode.

2. The control device according to claim 1, wherein:
   the electronic control unit includes a second control mode as another one of the control modes; and
   the electronic control unit is configured to control the actuator and the throttle so as to decrease the variable nozzle opening degree while maintaining the throttle at a fully-open opening degree or a substantially fully-open opening degree as the required air amount is increased in the high air amount range on the side of the maximum value in the second control mode.

3. The control device according to claim 2, wherein the electronic control unit is configured to control the actuator, in the first control mode, so as to start closing the variable nozzle from the fully-open opening degree at a specific required air amount value that is small compared to during execution of the second control mode as the required air amount is increased.

4. The control device according to claim 3, wherein the electronic control unit is configured to control the actuator, in the first control mode, so as to maintain the variable nozzle at the fully-closed opening degree or the substantially fully-closed opening degree after gradually decreasing the variable nozzle opening degree toward the fully-closed opening degree as the required air amount is increased in the air amount range on the high flow rate side relative to the specific required air amount value.

5. The control device according to claim 1, wherein:
   the internal combustion engine includes an ignition device;
   the electronic control unit is configured to control the ignition device so as to advance an ignition timing from a basic ignition timing, the basic ignition timing being on a retarded side relative to an optimum ignition timing, closer to the optimum ignition timing when the first control mode is selected under an engine operation condition under which the basic ignition timing is selected; and
   the electronic control unit is configured to correct the variable nozzle opening degree that is set in the first control mode to a closed side by such an amount that cancels a fuel efficiency improvement margin due to advancement of the ignition timing.

6. The control device according to claim 1, wherein:
   a vehicle on which the internal combustion engine is mounted includes an input device that is configured to receive, from a driver, a noise-priority request to give priority to exhaust noise reduction over a fuel efficiency of the vehicle; and
   the electronic control unit is configured to select the first control mode when the input device has received the noise-priority request.

7. The control device according to claim 1, wherein the electronic control unit is configured to select the first control mode when a vehicle on which the internal combustion engine is mounted is traveling in at least one of a location and a time band in which priority is to be given to exhaust noise reduction over a fuel efficiency of the vehicle.

8. The control device according to claim 1, wherein:
   a vehicle on which the internal combustion engine is mounted includes a noise meter that is configured to measure exhaust noise emitted from an exhaust port; and
   the electronic control unit is configured to select the first control mode when a value of the exhaust noise measured by the noise meter is larger than a threshold.

9. A control device for an internal combustion engine including a variable-capacity turbocharger that includes a turbine with a variable nozzle and an actuator configured to control a variable nozzle opening degree, a throttle disposed in an intake passage, and a variable valve drive mechanism that is configured to be able to change valve opening characteristics of an intake valve, the control device comprising an electronic control unit configured to:
   include a first control mode as one of control modes for an intake air amount; and
   when an air amount range on a high flow rate side including a maximum value of a required air amount for the internal combustion engine is defined as a high air amount range, control the throttle and the variable valve drive mechanism so as to meet the required air amount while controlling the actuator so as to maintain the variable nozzle at a fully-closed opening degree or a substantially fully-closed opening degree, or so as to decrease the variable nozzle opening degree, as the required air amount is increased in the high air amount range on a side of the maximum value in the first control mode.

10. The control device according to claim 9, wherein:
    the electronic control unit includes a second control mode as another one of the control modes; and
    the electronic control unit is configured to control the actuator and the throttle so as to decrease the variable nozzle opening degree while maintaining the throttle at a fully-open opening degree or a substantially fully-open opening degree as the required air amount is increased in the high air amount range on the side of the maximum value in the second control mode.

11. The control device according to claim 10, wherein the electronic control unit is configured to control the actuator, in the first control mode, so as to start closing the variable nozzle from the fully-open opening degree at a specific required air amount value that is small compared to during execution of the second control mode as the required air amount is increased.

12. The control device according to claim 11, wherein the electronic control unit is configured to control the actuator, in the first control mode, so as to maintain the variable nozzle at the fully-closed opening degree or the substantially fully-closed opening degree after gradually decreasing the variable nozzle opening degree toward the fully-closed opening degree as the required air amount is increased in the air amount range on the high flow rate side relative to the specific required air amount value.

13. The control device according to claim 9, wherein:
the internal combustion engine includes an ignition device;
the electronic control unit is configured to control the ignition device so as to advance an ignition timing from a basic ignition timing, the basic ignition timing being on a retarded side relative to an optimum ignition timing, closer to the optimum ignition timing when the first control mode is selected under an engine operation condition under which the basic ignition timing is selected; and
the electronic control unit is configured to correct the variable nozzle opening degree that is set in the first control mode to a closed side by such an amount that cancels a fuel efficiency improvement margin due to advancement of the ignition timing.

14. The control device according to claim 9, wherein:
a vehicle on which the internal combustion engine is mounted includes an input device that is configured to receive, from a driver, a noise-priority request to give priority to exhaust noise reduction over a fuel efficiency of the vehicle; and
the electronic control unit is configured to select the first control mode when the input device has received the noise-priority request.

15. The control device according to claim 9, wherein the electronic control unit is configured to select the first control mode when a vehicle on which the internal combustion engine is mounted is traveling in at least one of a location and a time band in which priority is to be given to exhaust noise reduction over a fuel efficiency of the vehicle.

16. The control device according to claim 9, wherein:
a vehicle on which the internal combustion engine is mounted includes a noise meter that is configured to measure exhaust noise emitted from an exhaust port; and
the electronic control unit is configured to select the first control mode when a value of the exhaust noise measured by the noise meter is larger than a threshold.

* * * * *